No. 759,616. PATENTED MAY 10, 1904.
M. L. KEYES.
MACHINE FOR MOLDING ARTICLES FROM PULP.
APPLICATION FILED JAN. 12, 1903.
NO MODEL. 4 SHEETS—SHEET 1.
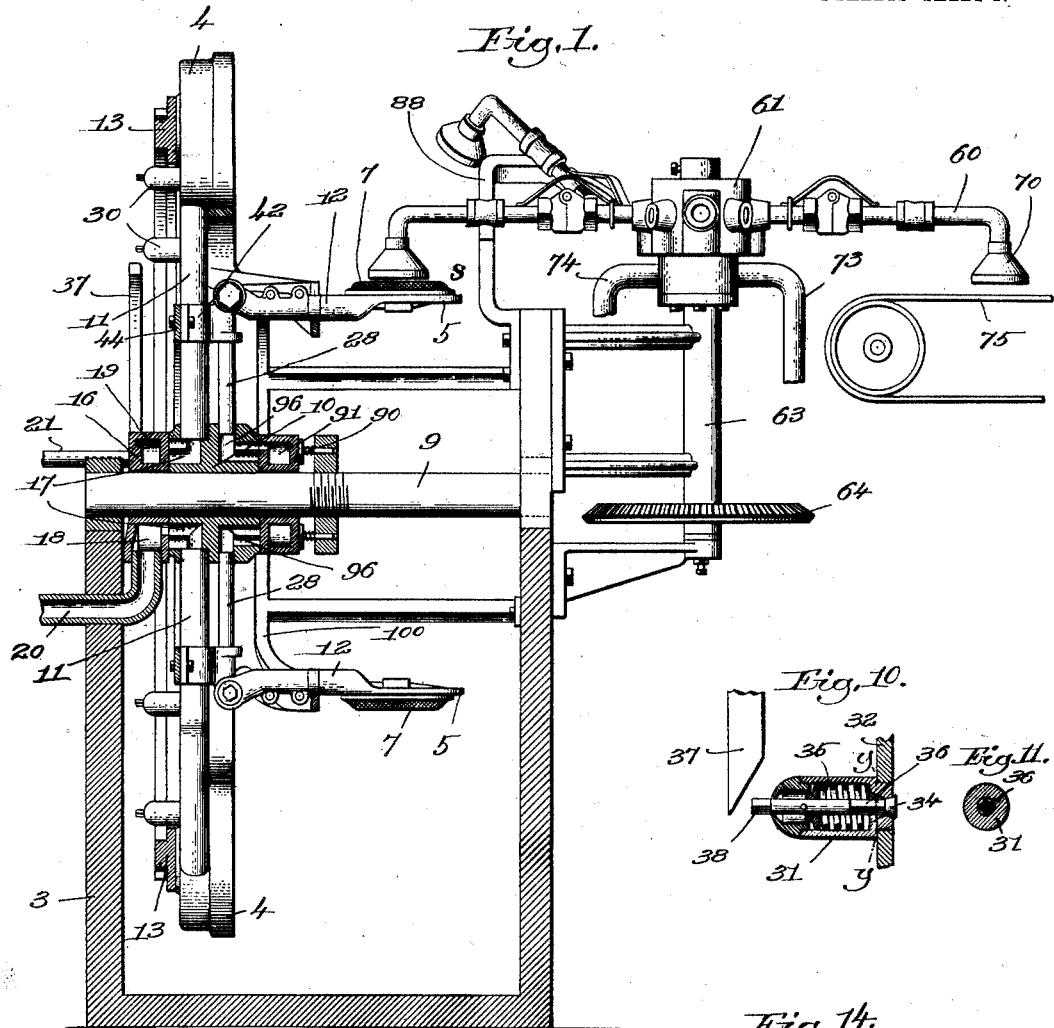
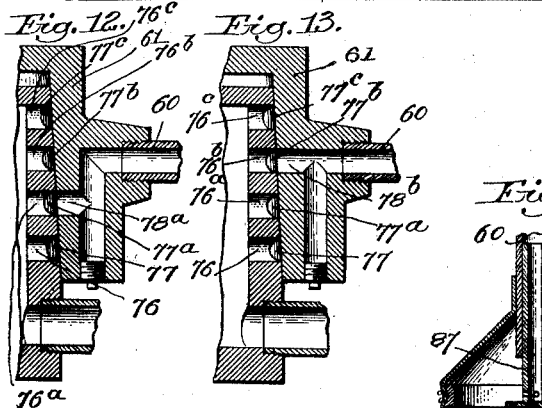
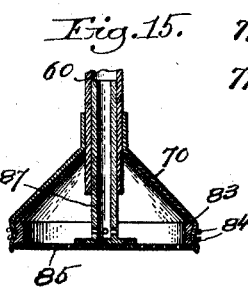
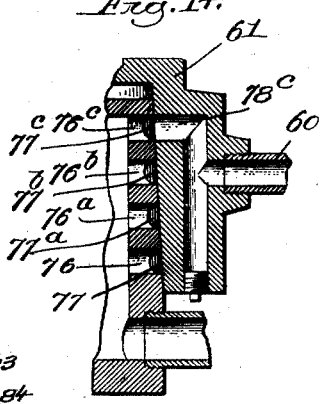
Witnesses:
Inventor.
Martin L. Keyes,

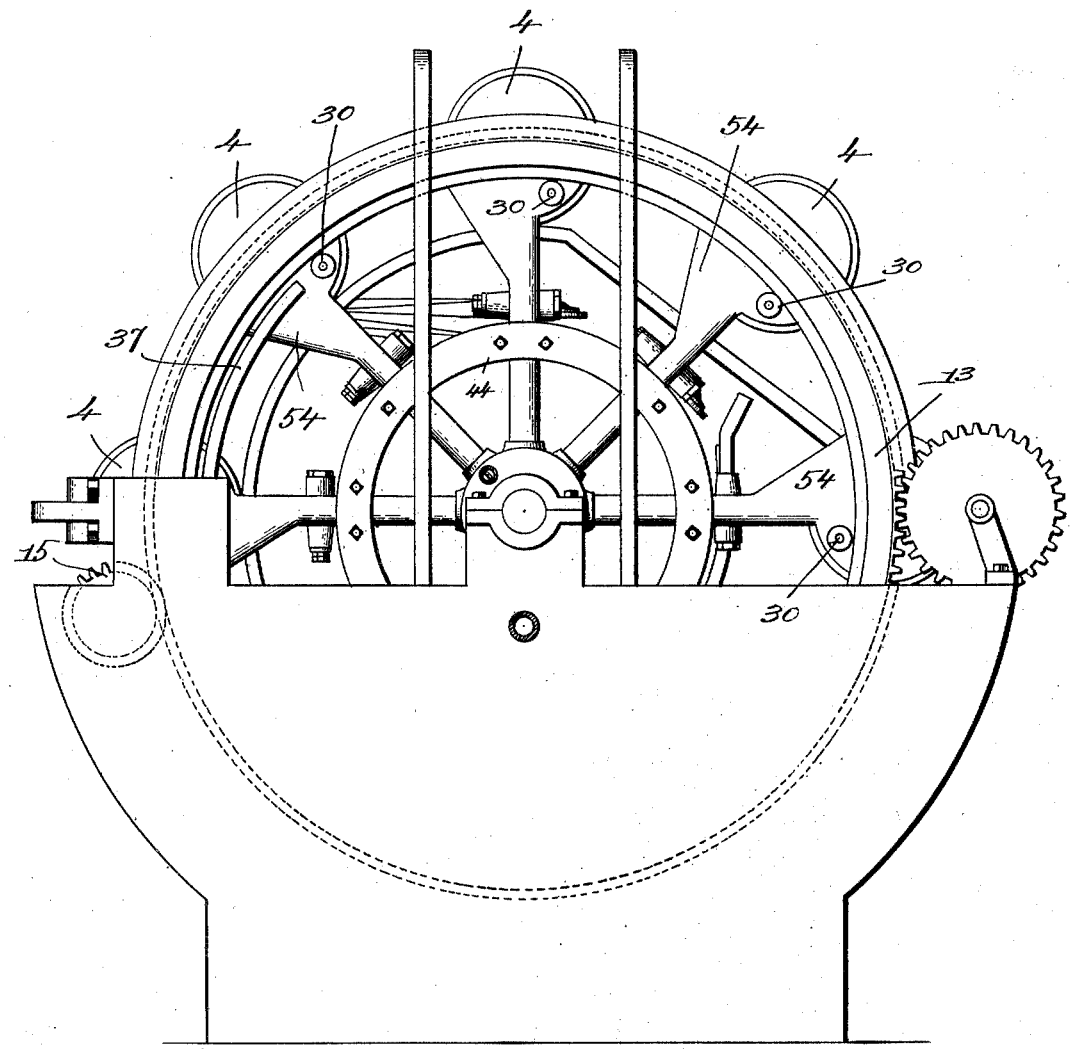

No. 759,616. PATENTED MAY 10, 1904.
M. L. KEYES.
MACHINE FOR MOLDING ARTICLES FROM PULP.
APPLICATION FILED JAN. 12, 1903.
NO MODEL. 4 SHEETS—SHEET 3.
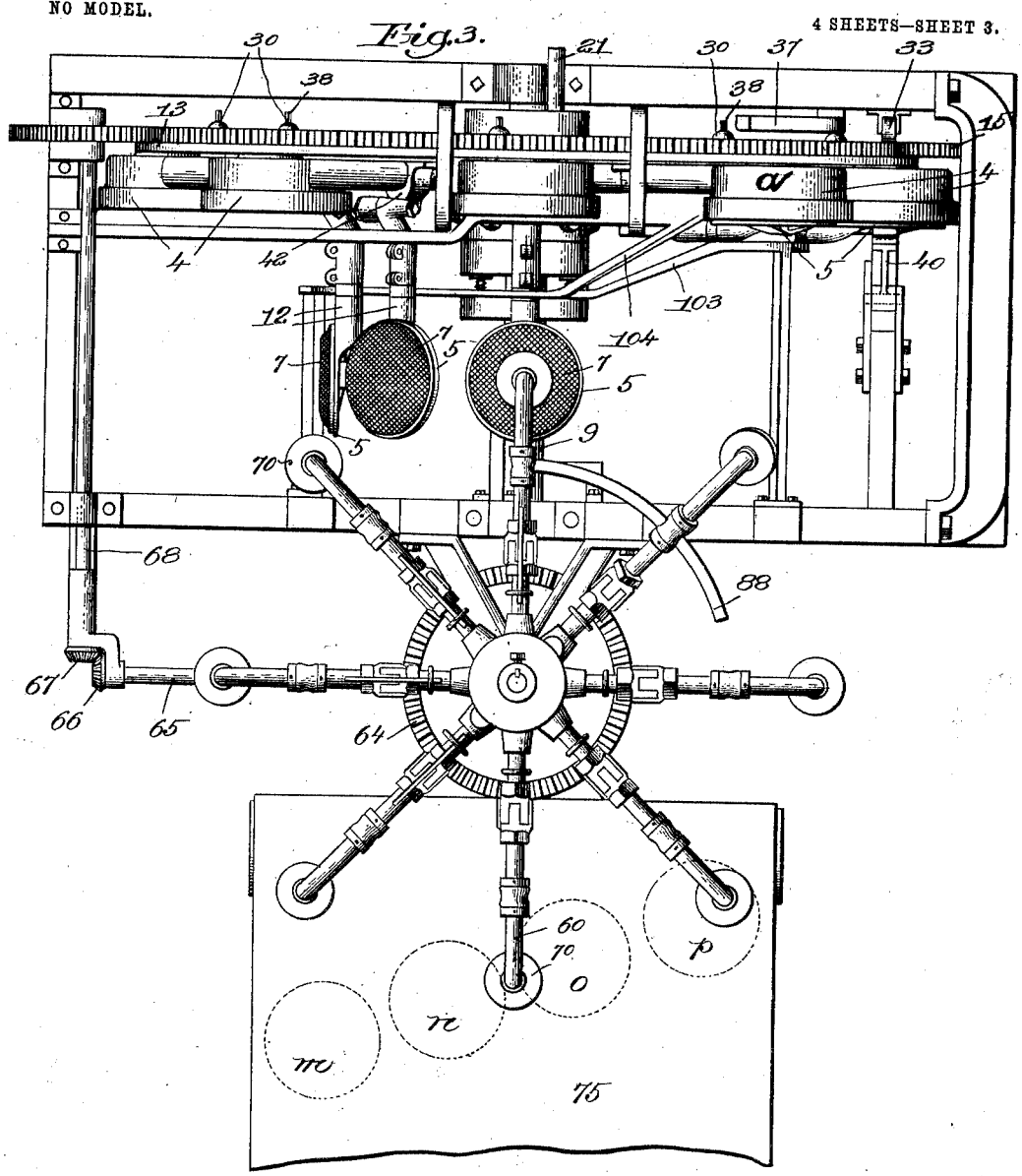

No. 759,616. PATENTED MAY 10, 1904.
M. L. KEYES.
MACHINE FOR MOLDING ARTICLES FROM PULP.
APPLICATION FILED JAN. 12, 1903.
NO MODEL. 4 SHEETS—SHEET 4.
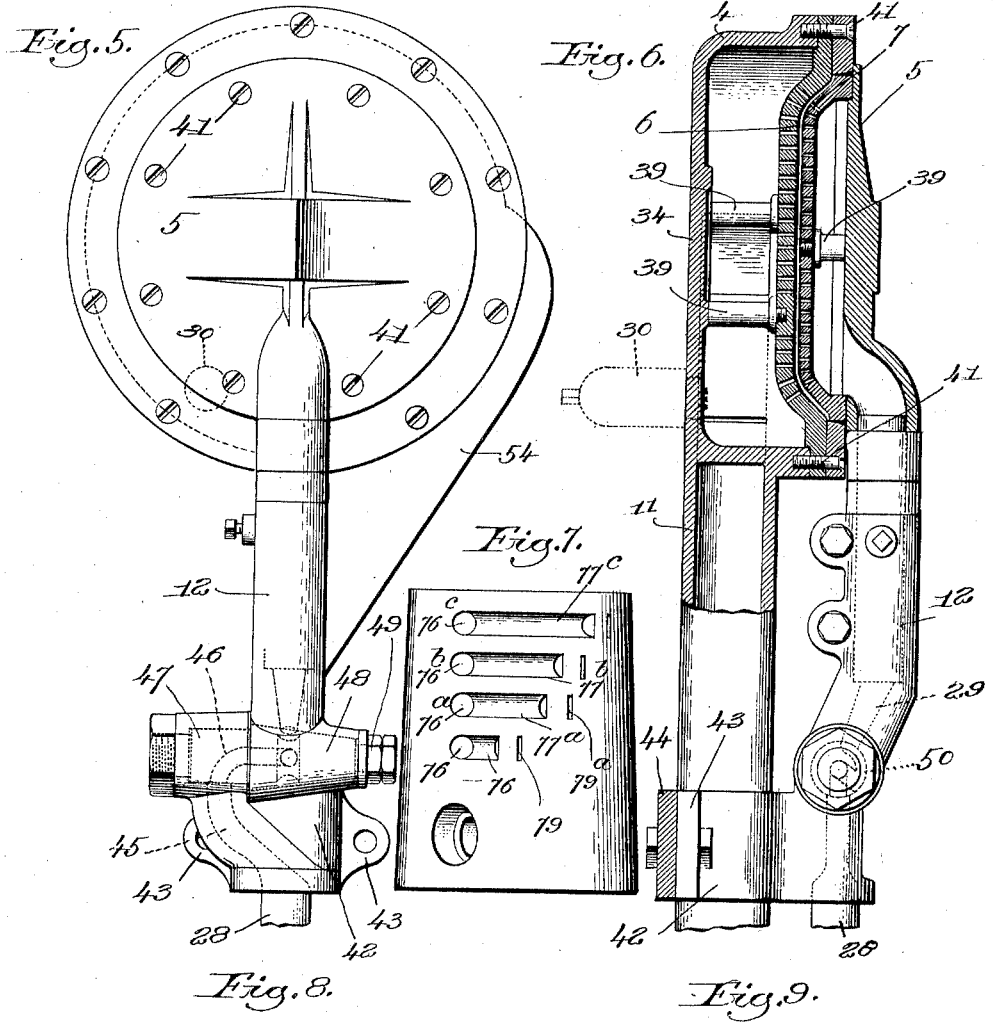
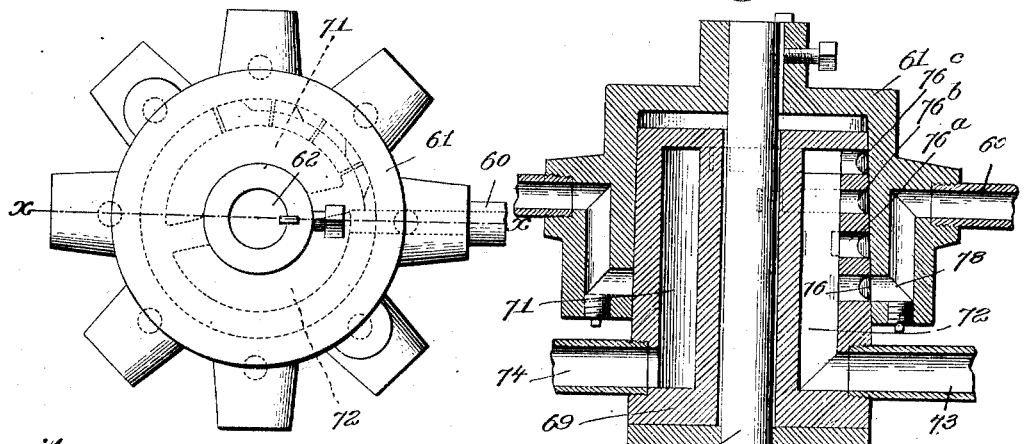

No. 759,616. Patented May 10, 1904.

UNITED STATES PATENT OFFICE.

MARTIN L. KEYES, OF CAMBRIDGE, MASSACHUSETTS.

MACHINE FOR MOLDING ARTICLES FROM PULP.

SPECIFICATION forming part of Letters Patent No. 759,616, dated May 10, 1904.

Application filed January 12, 1903. Serial No. 138,664. (No model.)

*To all whom it may concern:*

Be it known that I, MARTIN L. KEYES, a citizen of the United States, and a resident of Cambridge, county of Middlesex, State of Massachusetts, have invented an Improvement in Machines for Molding Articles from Pulp, of which the following description, in connection with the accompanying drawings, is a specification, like characters on the drawings representing like parts.

In my patent granted September 29, 1903, No. 740,023, I have described and claimed a machine for molding articles from pulp, which comprises a mold having a plurality of mold-faces between which the article is formed, means whereby one of the mold-faces is dipped into a body of pulp to receive a layer therof and subsequently closed against the other face of the mold, thereby compressing the pulp layer between said face and forming the article. In the particular embodiment of the invention illustrated in the said patent a plurality of traveling molds are employed which are carried by a revolving mold-carrier, and as each mold dips into the pulp a layer of the latter is drawn onto one of the mold-faces by suction. After the mold rises from the pulp and the layer of pulp is compressed between the mold-faces the latter are separated from each other and the shaped article is discharged from the mold by compressed air, which is blown through the perforated faces of the mold. The machine shown in said patent also includes a pneumatic transferring device constructed to receive the formed articles from the mold and transfer them to a suitable conveyer, which in turn passes them into or through an oven for the purpose of drying them.

My present invention has for its object to improve the structure described in said patent, all as more fully hereinafter described and then pointed out in the claims.

In the drawings, Figure 1 is a view showing my improved molding-machine in vertical section. Fig. 2 is a side elevation thereof. Fig. 3 is a plan view. Fig. 4 is a detail of the transferring mechanism hereinafter described. Fig. 5 is an enlarged elevation on one of the molds. Fig. 6 is a side view of said molds, parts of the molds being broken out to better show the construction. Fig. 7 is a detail of the transferring mechanism hereinafter described. Fig. 8 is a top plan view of the hub of the transferring mechanism. Fig. 9 is a section on the line $x\,x$, Fig. 8. Fig. 10 is a detail hereinafter referred to. Fig. 11 is a section on the line $y\,y$, Fig. 10. Figs. 12, 13, 14, and 15 are details hereinafter more fully described.

The molding mechanism herein illustrated is similar in its principal features to that illustrated and described in my above-mentioned patent and includes a mold-carrier mounted on a pivotal shaft 9, situated above a pulp-containing vat 3.

The mold-carrier comprises a hub 10, rotatable about the shaft and from which radiate a plurality of hollow arms 11, each carrying a mold. The molds each have two faces 6 and 7, between which the article is formed, said faces being formed on the members 4 and 5, respectively, of each mold. The member 4 of each mold is fixed to its arm 11, while the member 5 has a hollow stem 12, which is pivoted to said arm, whereby the two mold-faces of any mold may move toward and from each other. The mold-carrier is rotated by a gear 13, meshing with the driving-gear 15. The hub 10 has a separate port 17 communicating with each arm 11, and during the rotation of the carrier each port comes into communication first with the vacuum-chamber 18 and then with the compressed-air chamber 19 in a suitable stationary collar 16. The chamber 18 is connected by a pipe 20 with a suitable exhaust mechanism, (not shown,) while the chamber 19 is similarly connected by a pipe 21 with a compressed-air mechanism. (Not shown.)

The parts thus far referred to are and may be all as described in said patent, and, briefly stated, their operation is as follows: As the mold-carrier is rotated the member 4 of each mold is dipped into the pulp, and as the face 6 of any mold becomes immersed the port 17, corresponding to said mold, is brought into register with the vacuum-chamber 18, and the vacuum established in the member 4 of said mold causes a layer of pulp to adhere to the face thereof. As the mold rises from the vat the two members pass between a compression device 40, comprising a roll 33 and a swinging cam member 40, whereby the layer of pulp is compressed between the mold-faces. After passing through the compression device and when the mold approaches a vertical position the port 17, corresponding to said mold, is brought into register with the compressed-air chamber 19 and air is blown through the perforated face 6 of said mold, thereby separating the mold members and loosening the article from said face 6. The formed article upon being loosened from the face 6 adheres to the face 7 and is carried by the mold member 5 into position to be received by a suction-nozzle 70 of the transferring device. As the mold member 5 swings into its open or horizontal position and the suction-nozzle comes into register with the formed article on the face 7 compressed air is admitted to the member 5 to loosen the formed article therefrom, and at the same time suction is applied to the suction-nozzle, whereby the formed article is transferred from the face 7 to the suction-nozzle and carried by the latter to the conveyer 51, as described more at length in my above-mentioned patent. In the form of apparatus herein illustrated the stem 12 of each mold member 5 has constant communication with a port 96 in the hub, there being a separate port 96 for each of the mold members 5. Supported on the shaft 9 is a non-rotary collar 90, having a chamber 91 connected with a compressed-air apparatus, and said collar has a suitable port so situated that when each mold member 5 falls into the horizontal position shown in the upper portion of Fig. 1 the port 96 registers with the port leading to the compressed-air chamber 91 and a blast of air is admitted to the mold member 5. The opening movement of the mold member 5 is controlled by guides or tracks 103 104, between which the stem 12 of said member travels. The particular construction of track or guide for the swinging mold member and the manner of admitting compressed air or applying suction to the mold member 5 are not herein claimed, as they form the subject-matter of my copending application, Serial No. 85,134.

I have found from experiment that it is very essential that all of the water should be drained from the member 4 of any mold before the air is admitted to said member, for if any water remains in the mold the blast of air will blow such water through the perforated mold-face and soften the article to such a degree that it cannot be handled.

In order to more effectively drain the members 4 of any mold, I provide each member with a draining-chamber 54, which communicates with the interior of said member and is situated on the under side thereof as it rises from the pulp. The shape of said draining-chamber is such that by the time the mold gets into the position in which the members are about to be separated all sides of said draining-chamber have a downward slant, whereby water which has accumulated in the member 4 can drain out thereof by gravity. I find, however, that even with this chamber 54 the water is not always entirely drained from the mold, and to further facilitate the draining I have in this invention provided means whereby air may be admitted to the member 4 of each mold subsequent to the compressing operation and during the time that the said member is connected with the vacuum-chamber. The result of this construction is that the exhaust apparatus will draw a current of air into and through the member 4 of each mold, which will result in sweeping all of the water from said member, so that when air is admitted to said member no water will be blown through the perforated face and into the pulp article. This result is accomplished in this embodiment of my invention by providing the member 4 of each mold with a valve 30 and providing means for opening said valve at the proper time to admit air to the member 4.

The form of valve herein employed is illustrated in Figs. 10 and 11 and comprises a valve-shell 31, which is secured to the wall 32 of the mold member 4 in any suitable way and which has a valve-seat closed by an automatic valve 34. The valve is held to its seat by a spring 35, which is of such a strength as to hold the valve closed even while the air is exhausted from the member 4. The valve-stem projects beyond the casing 31, as at 38, and a suitably-supported actuating-cam 37 is situated in the path of said projecting end 38. The portion 36 of the valve-stem is reduced in size somewhat, so that when the valve is unseated air may pass in around said stem. The cam 37 is so situated that the valve on any one mold will be opened about the time the mold is passing through the compression device, and preferably the cam will have such an extent that the valve will be held open until just prior to the time that said member is brought into communication with the compressed-air chamber 19.

It will be seen from the above that during the time the valve is opened a current of air will be drawn into the mold member 4 and through the stem 11, which will result in effectively sweeping all water from the mold member and the stem. As soon, however, as the end of the valve-stem passes off from the cam 37 the valve automatically closes, so that when the stem 11 is brought into communication with the compressed-air chamber 19 the air will be forced through the stem and into the mold member, thereby to force the mold members apart and loosen the article from the molding-face 6, as above described.

From the above it will be seen that the current of air which sweeps the water from the mold member 4 passes through the member and its stem 11 in one direction, while the air which loosens the article from the face 6 passes through the stem and member in the opposite direction.

Another feature of my invention resides in so constructing the mold that the faces thereof may be changed to form differently-shaped articles.

Referring to Fig. 6, it will be seen that the face 6 of the member 4 is detachably secured to said member by any suitable means, such as screws 41, and that the said member 4 is deep enough so that a mold-face having a much greater concavity than that illustrated in Fig. 6 can be employed, if desired. The mold-face 7 of the member 5 is also detachably secured to the latter, so that by removing the mold-faces of any mold and employing others of different contour any desired shape of article may be molded, as will be obvious.

In order to prevent the mold-faces from bending or giving when the air is exhausted from the members, I will preferably provide suitable struts 39. These struts are herein illustrated as being screwed into the back side of the face and as resting against the back of the mold member. In this way they are removable with the faces of the mold. This construction, however, is not essential, as the struts may be made in any suitable way.

Another feature of my present improvement resides in the character of the joint uniting the stem 12 of each mold to the arm 11.

In order to make a joint which will rigidly hold the pivoted member of the mold in its proper position, I have devised the form of joint best illustrated in Fig. 5.

42 designates a U-shaped member which embraces the stem 11 and has feet 43, which are bolted to a stiffening-ring 44. This U-shaped member or casting has connected thereto the pipe 28 and is provided with a port 45, communicating with said pipe, said port also communicating with a port 46 in a plug 47, seated in a socket in the casting 42. The plug projects beyond the casting and is received by a sleeve 48 on the end of the stem 12, the said sleeve being held in place by suitable nuts 49 on the end of the plug. The port 46 in the plug terminates in a groove 50, extending part way around the plug, and said groove is in register with the port 29 in the arm 12, said port 29 and groove 50 being in communication in any position of said arm. This construction makes a very rigid bearing for the pivoted mold-carrier and one which is not liable to get out of true. After the pulp article has been formed in the mold and the two faces of the mold have been separated and the face 7 brought into the horizontal position shown at the upper part of Fig. 1 and the vacuum destroyed in the mold member 5 a transferring device comprising a suction-nozzle 70, supported by a hollow arm 60, is brought into register with the face 7, picks off the formed article from said face and transfers it to a suitable conveyer.

The type of transferring device herein illustrated is similar in its main features to that shown in my patent and it operates in the same way. The specific construction of device herein illustrated, however, is slightly different and will now be described.

The hollow arms 60 are supported by a hub or cap 61, carried by a shaft 62, which is supported in suitable bearings 63 and driven in any suitable way, as by means of a shaft 68, which is driven from the mold-carrier and which in turn drives the counter-shaft 65 by means of gears 66 67, said shaft 65 being geared to the shaft 62 by means of a bevel-gear 64. Any other suitable driving mechanism may be employed for the shaft 62, however. The upper end of the standard 63 has mounted thereon a chambered head 69, the said head having two chambers therein, 71 and 72, one of which, the chamber 72, is connected with the vacuum or exhausting apparatus by a pipe 73, and the other of which, the chamber 71, is connected by any suitable pipe 74 with the compressed-air apparatus. The hub 61 fits over and rotates about the the head 69, and to make a tight joint I will preferably make the head and the bore in the hub or cap 61 slightly tapering as shown. The said cap or hub 61 has also a series of ports which communicate with the several arms 60 and which are adapted as the hub rotates to be successively brought into communication first with the vacuum-chamber 72 and then with the compressed-air chamber 71, each port being brought into register with the vacuum-chamber at the time that the suction-nozzle at the end of the corresponding arm is brought into register with the member of any mold. The pulp article is thereby transferred from the mold member 5 to the suction-nozzle or pick-off 70 by the combined action of the compressed air in the mold member and suction in the nozzle, and this suction or vacuum continues while the transferring device is rotated until the suction-nozzle 70 is brought over the conveyer 75, which may be of any suitable construction.

I preferably make my conveyer wide enough to receive a series of articles side by side, as illustrated best in Fig. 3, where the conveyer is shown as wide enough to have four articles abreast. It is necessary, therefore, that the articles be dropped from the suction-nozzles in different relative positions, the first article being dropped on the belt in position *m*, the next succeeding one in the position *n*, the third in the position *o*, and the fourth in the position *p*, when the next succeeding or fifth one will be dropped in the same position that article *m* was, the belt having in the meantime advanced forward sufficiently so that the articles are not dropped on top of each other.

To accomplish this, I provide the head 69 with a series of ports 76 76ª 76ᵇ 76ᶜ, arranged one above the other, as shown in Figs. 7 and 9, the said ports communicating at one end with the vacuum-chamber 72 and at the other end opening into grooves 77 77ª 77ᵇ 77ᶜ, respectively, extending partially around the head. The port 78 in the hub 61 for one of the arms 60 will, as illustrated in Fig. 9, be constructed to communicate with the lower port 76, while the port 78ª for the next arm will be constructed to communicate with the second port 76ª, Fig. 12, the port 78ᵇ for the third arm being constructed to register with the port 76ᵇ, Fig. 13, and the port 78ᶜ for the fourth arm 60 being constructed to register with the port 76ᶜ, Fig. 14. The ports 76 76ª 76ᵇ 76ᶜ are all in the same vertical plane, so that the air will be exhausted from each suction-nozzle when it reaches the same relative position; but as the grooves 77 77ª 77ᵇ 77ᶜ are of different lengths (see Figs. 7 and 8) the vacuum will be maintained on the successive suction-nozzles for different lengths of time. When the port 78 comes into register with the port 76, a vacuum is established in the corresponding nozzle and the article is held thereto by suction, and as the port 78 passes out of register with the groove 77 said port is brought into register immediately with a small port 79, communicating with the compressed-air chamber 71, whereby air is admitted to the arm 60 and the article is dropped upon the belt 75 in the position m. The port 78ª of the next arm is brought at the proper instant into register with the port 76ª, and the above operation is repeated, the vacuum remaining so long as the port 78ª registers with groove 77ª, and as said port 78ª passes out of register with the groove it comes into register with a port 79ª, connecting with the compressed-air chamber, thus causing the article to be dropped in position designated by m. The same operation is repeated for the two succeeding arms, the articles being dropped in the positions marked o and p upon the belt. The fifth arm, however, will have a port 78 corresponding in all particulars with the port of the first arm, so that the article of the fifth plate will be dropped immediately behind the position m of the first plate. I wish it understood, however, that by varying the arrangement of ports in the cap 61 and head 69 the articles may be dropped on the conveyer either in a single line or in rows of any number.

I consider the arrangement shown, wherein the articles are dropped in rows of four, as most convenient; but my invention contemplates any suitable arrangement of ports in the head.

Each arm is provided with a self-packing hinge-joint 89, and a suitable cam 88 is employed for raising the suction-nozzles as they approach the mold to prevent the said nozzles from clashing with the said mold, all as described at length in my said patent.

The nozzle herein employed is similar in all respects to that shown in the above-mentioned patent except that the guard 85 is provided with a hollow stem 87, which plays up and down in the arm 60, and thus serves as a guide to maintain the mouth of the nozzle in proper position.

Since my invention is not limited to the form herein illustrated, it will be obvious that many changes may be made in the constructional details of the parts without in any way departing from the invention described in the appended claims, and therefore I reserve to myself the right to make all changes that will come within the scope of said claims.

Having described my invention, what I claim, and desire to secure by Letters Patent, is—

1. In a machine for molding articles from pulp, a mold having a plurality of separable members one of which is hollow, means to cause said member to dip into a body of pulp, means to apply suction to said member whereby a layer of pulp is deposited thereon, means to compress the pulp layer between said members, and means to admit a current of air to said member during the time suction is applied thereto whereby all water is swept out of said member.

2. In a machine for molding articles from pulp, a mold having a plurality of separable members one of which is hollow, means to cause said latter member to dip into a body of pulp to receive a layer thereof, means to compress said layer between the members of the mold, and means to cause a current of air to pass through the hollow member of the mold after the compressing operation and before the mold members are separated, whereby all surplus water is swept out of said member.

3. In a machine for molding articles from pulp, a mold having a plurality of separable members, one of which is hollow and has a perforated molding-face, means to cause said latter member to dip into a body of pulp, means to apply suction to said member whereby a layer of pulp is deposited on the face thereof, means to compress said pulp layer between the members of the mold, and means independent from said molding-face to admit air to the said member while suction is applied thereto whereby all water is forced out of said member.

4. In a machine for molding articles from pulp, a mold comprising separable members one of which is hollow and has a perforated molding-face, means to compress a layer of pulp between said face and the other member and shape said article, means to loosen the article from said face by a blast of air, and means to pass a current of air through said member prior to the loosening of the article from the face thereof, whereby all water is removed from said member.

5. In a machine for molding articles from pulp, a mold comprising separable members, one of which is hollow and has a perforated molding-face, means to compress a layer of pulp between said face and the other member and thus shape said article, means to loosen the shaped article from said face by a blast of air, and means independent from said face to pass a current of air through said member prior to the loosening of the article from the face thereof.

6. In a machine for molding articles from pulp, a mold comprising two separable members one of which is hollow and has a perforated molding-face, means to cause said member to dip into a body of pulp, means to apply suction to said member whereby pulp is deposited on the face thereof, and a valve device to admit air to said member during the time suction is applied thereto.

7. In a machine for making articles from pulp, a traveling mold comprising two separable members, one of which is hollow and has a perforated molding-face, means to cause said member to dip into a body of pulp, means to apply suction to said member whereby a layer of pulp is deposited on the face thereof, means to compress said pulp between said members at a point farther on, and means to admit air to said hollow member during the time that suction is applied thereto, said means being independent from the face of said member.

8. In a machine for molding articles from pulp, a traveling mold comprising two separable members one of which is hollow and has a perforated molding-face, means to cause said member to dip into a body of pulp, means to apply suction to said member whereby pulp is deposited on the face thereof, and a valve device operating during the traveling movement of the mold to admit air to said member during the time suction is applied thereto.

9. In a machine for molding articles from pulp, a traveling mold comprising two separable mold members one of which is hollow and has a perforated mold-face, said mold in its traveling movement causing said hollow member to dip into and rise from a body of pulp, means to apply suction to said member, whereby a layer of pulp is deposited on the face thereof, means to compress said pulp layer between said members, a valve carried by the hollow member, and means to open the valve during the traveling movement of the mold and while suction is applied to said hollow member.

10. In a machine for molding articles from pulp, a hollow mold member having a perforated molding-face, means to cause said member to dip into a body of pulp, means to apply suction to said member whereby a layer of pulp is deposited on the face thereof, and a valve device to admit air to said member while suction is still applied thereto.

11. In a machine for molding articles from pulp, a hollow mold member having a perforated molding-face, means to cause said member to dip into a body of pulp to receive a layer of the latter, means to compress said layer on said face, means to cause a current of air to pass through said mold member in one direction while the pulp layer is being compressed to sweep the water from said member and to pass through the member in a reverse direction to loosen the completed article from the face of said member.

12. In a machine for molding articles from pulp, a mold having a plurality of separable members one of which is hollow, means to cause said latter member to dip into a body of pulp to receive a layer thereof, means to compress said layer between the members of the mold, and means to cause a current of air to pass through the hollow mold member in one direction while said members are closed together to sweep the water from said member, and to pass through the member in a reverse direction to loosen the completed article from the face thereof.

13. In a machine for molding articles from pulp, a mold comprising two separable hollow mold members each having a removable molding-face, means to compress a layer of pulp between said faces, and supporting-struts on the interior of said members to prevent the faces from springing when the layer is compressed.

14. In a machine for molding articles from pulp, a rotating hub having radially-extending hollow arms, a mold carried by each arm, each mold comprising separable members one of which is pivoted to the corresponding arm, and an annular tie member to which each of the arms is secured substantially at the point where the corresponding swinging member is pivoted to said arm.

15. In a machine for molding articles from pulp, a rotating hub having radially-extending arms, a pivot member embracing each arm, a ring to which all of said pivot members are attached, and a mold member pivoted to each pivot member.

16. In a machine of the class described, a mold comprising two separable mold members, one of which is pivoted and has a sleeve extending parallel to the pivotal axis of said member, and a plug extending through said sleeve and on which said member is pivoted.

17. In a machine for molding articles from pulp, a mold-carrier having a plurality of radially-extending arms, a pivot-block embracing each arm, a ring to which all said blocks are secured, and a mold member pivoted to each block, each member having a sleeve which turns about a plug projecting from the corresponding block.

18. In a machine for making pulp articles, a mold comprising separable members having faces between which the article is formed, means to cause one of said members to dip into a body of pulp and rise therefrom, and means to apply suction to the face of said member while it is immersed in the pulp, means to compress said pulp layer between the face and subsequently separate the faces for the removal of the articles, one of said members having a draining-chamber formed on one side thereof into which all water drains by gravity prior to the separation of the members.

19. In an apparatus for making pulp articles, pulp-molding mechanism, comprising a plurality of molds, and a transferring device to transfer the molded articles from the molds, said transferring device comprising a rotatable hub having ports in different axial positions, a suction-nozzle communicating with each port, a head on which said hub rotates and which has a vacuum and a compressed-air chamber, a plurality of ports leading to each of said chambers, said ports having different axial positions to correspond with the different axial positions in the ports in the hub, and the ports leading to the compressed-air chamber at different circumferential positions.

In testimony whereof I have signed my name to this specification in the presence of two subscribing witnesses.

MARTIN L. KEYES.

Witnesses:
  LOUIS C. SMITH,
  JOHN C. EDWARDS.